United States Patent [19]

Gadefelt et al.

[11] Patent Number: 4,706,623
[45] Date of Patent: Nov. 17, 1987

[54] CYLINDER HEAD FOR AN INTERNAL COMBUSTION ENGINE

[75] Inventors: Bengt Gadefelt; Lars Sääf, both of Södertälje, Sweden

[73] Assignee: Saab-Scania Altoebplag, Sweden

[21] Appl. No.: 736,372

[22] Filed: May 21, 1985

[30] Foreign Application Priority Data

May 22, 1984 [SE] Sweden ............................ 8402749

[51] Int. Cl.$^4$ .............................................. F02B 31/00
[52] U.S. Cl. ................................. 123/308; 123/193 H
[58] Field of Search ........... 123/306, 308, 315, 193 H, 123/432

[56] References Cited

U.S. PATENT DOCUMENTS

| 3,045,655 | 7/1962 | Formia | 123/308 |
| 4,246,874 | 1/1981 | Nakagawa et al. | 123/308 |

FOREIGN PATENT DOCUMENTS

| 2643326 | 3/1978 | Fed. Rep. of Germany. | |
| 0023220 | 2/1983 | Japan | 123/308 |
| 1151561 | 5/1969 | United Kingdom | 123/308 |
| 1212692 | 11/1970 | United Kingdom. | |

Primary Examiner—Craig R. Feinberg
Attorney, Agent, or Firm—Cushman, Darby & Cushman

[57] ABSTRACT

The invention relates to a cylinder-type head for an internal combustion engine, preferably an Otto-type engine, with four valves per cylinder. The cylinder head accommodates at least one combustion chamber with a pair of inlet ports situated side by side and a pair of exhaust ports, situated opposite the inlet ports. With the object of facilitating gas flowing into the combustion chamber to swirl about the cylinder axis, the invention is essentially distinguished in that the interior surface of the combustion chamber between an inlet port and an exhaust port is implemented with a swirl-generating means. At the intersection between the base plane of the cylinder head, said means form a protrusion projecting radially inwards. The remaining interior surfaces of the combustion chamber lack such protrusion at the intersection with the base plane. To reinforce the swirl generation, the inlet duct, with its port situated farthest away from the protrusion, is formed to give the gas a direction having a substantially lesser angle to the base plane than the corresponding angle of the gas direction from the second inlet duct.

10 Claims, 5 Drawing Figures

CYLINDER HEAD FOR AN INTERNAL COMBUSTION ENGINE

The present invention relates to a cylinder head for an internal combustion engine having at least one cylinder with a reciprocating piston, said cylinder head accommodating a combustion chamber for the cylinder with valve-regulated ports, which, when projected on a circular surface in the base plane of the cylinder head facing towards the cylinder are distributed with a port in each of four quadrants, so that with the quadrants numbered clockwise, the ports of a first and a second inlet duct are situated in a first and a second quadrant, respectively, and so that the ports of a first and a second exhaust duct are situated in a third and a fourth quadrant, respectively.

It is known from the U.S. Pat. No. 4,211,189 in an Otto-type engine with four valves per cylinder to create rotation about the cylinder axis of the fuel-air mixture flowing in during the induction stroke, this mixture being designated hereinafter "gas". This rotation, hereinafter designated "swirl", enables well controllable and economical combustion of the fuel in the engine. In the known solution one inlet duct has a substantially smaller throughflow area than the other inlet duct, and furthermore, the gas is directed from the narrow inlet duct at a relatively small angle to a plane normal to the cylinder axis in question. The larger duct gives the gas flowing into the combustion chamber from it a larger angle to the mentioned plane. The narrow duct thus causes the gas flowing into the combustion chamber to swirl, and by allowing gas flow only through the narrow duct at low loading and partial loading on the engine there is ensured swirling at these loading conditions. The other inlet valve does indeed open by the valve mushroom leaving its seat, but no gas flow appears to take place through the larger duct. Since the other inlet valve is sunk in a cavity, the swirl should not be affected by the valve opening. Gas inflow is also allowed through the other duct at greater loading, and the swirl is thus counteracted by this gas flow to such an extent that the swirl is eliminated.

The known solution has certain disadvantages, however. Accordingly, the utilization of differently large inlet ducts for providing a swirl results in that the power obtainable from the engine will be considerably less than if both inlet duct ports are given a maximum configuration and are the same size. The implementation with differently sized valves and a special cavity in the combustion chamber furthermore complicates manufacture of the cylinder head and makes it more expensive. There is also the risk of unfavourable temperature concentrations in the combustion chamber walls. Still further, it has been found in certain types of Otto engines with four valves per cylinder that a reduced swirl formation at high loadings, which is striven for and obtained in the above-mentioned, known engine, results in loud combustion noise, which can be disturbing from the comfort aspect when the engine is used in vehicles.

Other known methods of providing swirls in combustion chambers include ridges on the valve mushroom or adjacent the valve seat. The latter is the case in the U.S. Pat. No. 4,224,918, for example. These solutions, which are applied in Otto engines with two valves per cylinder, do indeed cause the gas flowing into the combustion chamber to swirl, but are burdened with the disadvantage of heavily throttling gas flow for high loading on the engine. Furthermore, the solutions result in relatively costly and troublesome manufacturing procedures for providing the ridges. Unfavourable wear of the valve mushroom can also be the result in the case where the ridge is placed on it, since here the valve is not allowed to rotate.

The present invention has the task of creating a swirl in the combustion chamber in a simple way, with a cylinder head described in the introduction, while the power obtainable from the engine shall remain uneffected as far as possible. An essential desire is thus to provide swirling in the higher loading range, thereby to dampen the combustion noise occurring in these loading conditions. In the mentioned respects, the invention is distinguished substantially in that between the port of the second inlet duct and the port of the first exhaust duct the interior surface of the combustion chamber is formed with a ridge or the like which at its intersection with the base plane forms a protrusion extending with its convex delineation radially towards the cylinder axis, and in that the remaining interior surfaces of the combustion chamber, where intersecting the base plane, lack such protrusions.

Asymmetry in the combustion chamber is created by the presence of this ridge, thus enabling the gas flow from the first inlet duct port to provide a swirl which is not eliminated by the gas flow from the second inlet duct port. The swirl-generating ridge may be readily formed in the wall of the combustion chamber and its swirl-generating effect rather than otherwise increases with increased gas flow, i.e. increased engine load.

An advantageous embodiment of the invention is characterized in that both inlet ducts are formed such that the first inlet duct gives the gas a direction with a substantially less angle to the base plane than the corresponding angle of the gas direction from the second inlet duct.

A further swirl-generating effect is obtained by the asymmetrical implementation of the inlet ducts, and this effect may be added to that obtained by the ridge mentioned above. It is essential here that it is the first inlet duct, which is thus situated farthest from the ridge, that guides the gas at a small angle to the base plane of the cylinder head. The second inlet duct, which is situated adjacent the ridge, consequently has a greater incident angle to the base plane, for avoiding inter alia by coaction with the ridge, direct confrontation with the swirl generated by the gas flow from the first inlet duct.

Remaining distinguishing features of the invention are apparent from the accompanying claims and the following description of an embodiment exemplifying the invention. The description is carried out with reference to the accompanying drawings, of which FIG. 1 illustrates a part of an inventive cylinder head with a combustion chamber projected onto the base plane of the cylinder head facing towards the cylinder;

Figure 1:
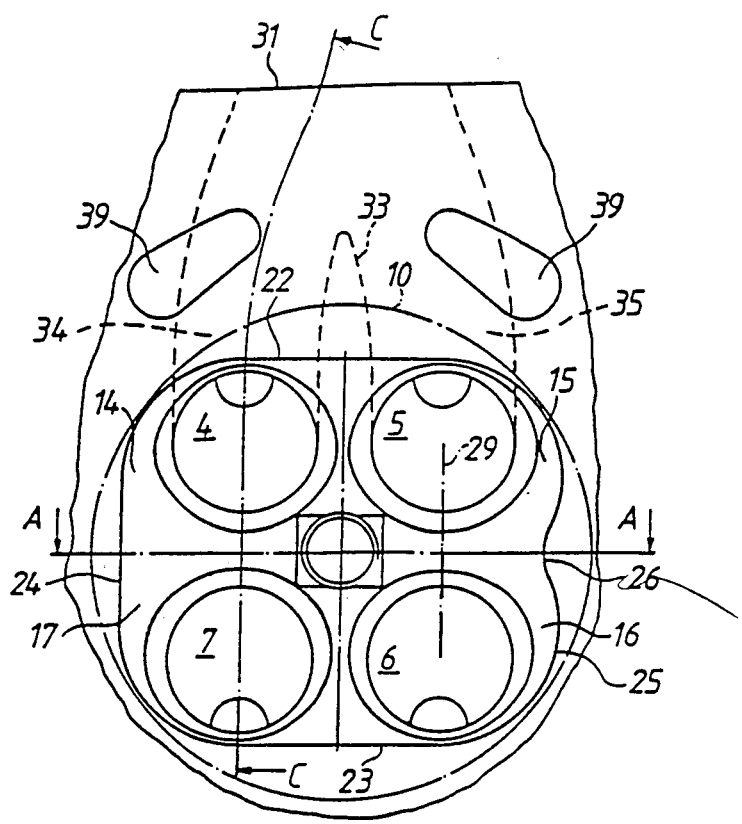

The inventive cylinder head 1 illustrated in the figures is intended for an Otto-type engine for operation in vehicles. The view in FIG. 1 of the base plane 2 of the cylinder head 1 illustrates a combustion chamber 3, which includes two inlet duct ports 4, 5, two exhaust duct ports 6, 7 and an opening 8 for an ignition means (not shown). The inlet duct ports 4, 5 are equally as large, and are somewhat larger than the exhaust duct ports 6, 7, which in turn are also equally as large. The ports 4–7 are distributed with a port in each of four quadrants 14–17 of a circle 10 defined by the diameter of the cylinder 11 in question. A piston 12 is arranged for conventionally executing reciprocatory motion in the cylinder 11. The piston motions are synchronized with the movements of customary valves 18, 19 regulating the inlet and exhaust ports 4–7 in a way well known for an internal combustion engine working on the Otto principle.

The quadrants 14–17 are indicated by chain dotted lines in FIG. 1, and are numbered clockwise so that the inlet port 4 is situated in the first quadrant 14, the inlet port 5 in the second quadrant 15, the exhaust port 6 in the third quadrant 16, and the exhaust port 7 in the fourth quadrant 17. The center of the circle is coincident with the central axis 20 of the cylinder and the center of the ignition means opening 8.

Where intersecting the base plane 2 of the cylinder head, the walls of the combustion chamber 3 form substantially straight side edges 22–24. The inlet quadrant 15 and the exhaust quadrant 16 are however mutually connected by a side edge 25, formed with a protrusion 26 located halfway between the duct ports 5, 6. The protrusion 26 extends from an imagined straight side edge situated symmetrically with the side edge 24, radially inwards towards the cylinder axis 20 a distance equalling at least 5 percent of the distance between the cylinder axis 20 and the straight side edge 24. To advantage, this distance is between 8 and 16 percent of the distance mentioned. The inwardly directed crest of the protrusion 26 has a radius approximately equal to that of the inlet port.

Figure 2:
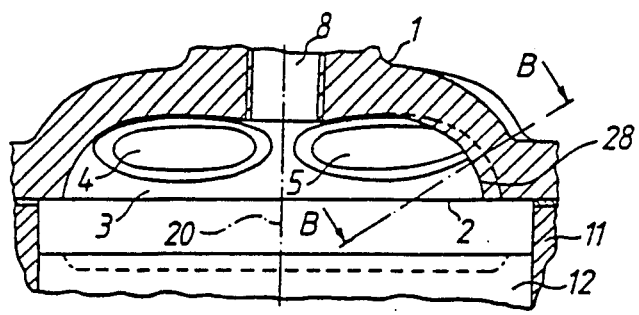
FIG. 2 is a section along the line A—A in FIG. 1 through the cylinder head placed on a cylinder block.
Figure 3:
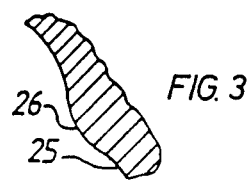
FIG. 3 is a section along the line B—B in FIG. 2.

The protrusion 26 extends along the combustion chamber wall and forms an inwardly extending ridge 28 between the inlet duct port 5 and the exhaust duct port 6 (see Figures 2 and 3). For a lesser requirement of swirl-generation, the ridge 28 may in its entirety lie radially outside a dashed line 29 in FIG. 1 between the centers of the exhaust and inlet ports 5 and 6. For increased swirl-generation the ridge 28 should, however, extend past the line 29 towards the ignition means opening 8. In a section through the line 29, the height of the ridge 28 relative the corresponding combustion chamber portion between the valves 4 and 7 may be up to about thirty percent of the through-flow radius of the inlet duct port.

Figure 4:
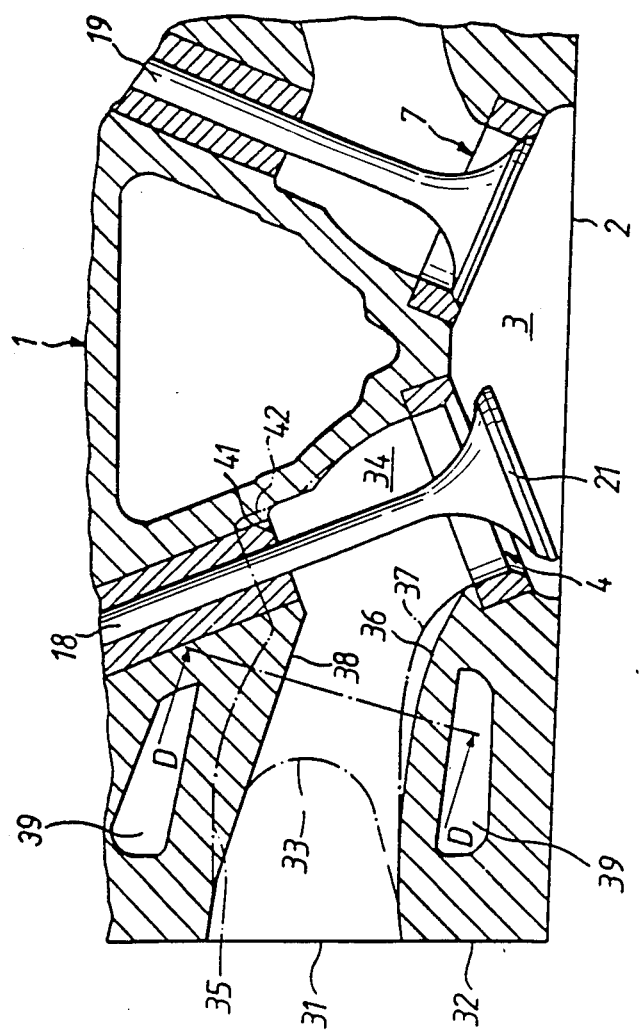
FIG. 4 is a section along the line C—C in FIG. 1, through the central plane of the left inlet and exhaust ducts of the cylinder head in FIG. 1, with valves fitted, a chain-dotted line indicating the corresponding section of the right inlet duct in FIG. 1.

The combustion chamber 3 depicted in the figures also has an implementation where the inlet and exhaust ports 4, 5 and 6, 7, respectively, are situated in planes intersecting each other and forming equal angles to the base plane 2 (see FIG. 4). The directions of motion of the inlet and outlet valves 18 and 19 also form equal angles to the base plane. It will also be seen from FIGS. 1 and 2 that between the side edges 22–25 and the cylinder circle 10 there are formed so-called squish surfaces, which at the end phase of the piston compression stroke conventionally create microturbulence in the combustion chamber 3 favourable to combustion.

Figure 5:
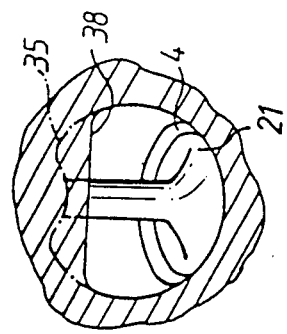
FIG. 5 is a section along the line D—D in FIG. 4, the chain-dotted inlet duct being shown placed in a duct depicted by full lines.

During the engine induction stroke the inlet valves 18 with their mushrooms 21 (see FIG. 4) uncover the ports 4, 5 so that the gas can flow into the combustion chamber 3. The mushrooms 21 guide the gas along the combustion chamber walls and the gas flowing in from the port 4 after about half a revolution, reaches the ridge 28 and the protrusion 26, which then guide the gas radially inwardly downwardly and prevent it from directly colliding with the gas flowing in from the other inlet port 5. The last-mentioned gas flow is confronted by the ridge 28 immediately after the mushroom 21 spreads the gas along the walls of the combustion chamber. The ridge 28 prevents the tendency of this gas flow to form a swirl counter-directed to the gas from the first inlet port 4. The gas flow from the inlet port 5 is given a considerable axial component by the guiding effect of the ridge 28, and this together with the guidance by the ridge 28 of the gas flow from the first inlet duct port 4 results in that the swirl generated by the latter gas flow may be retained for full load on the engine as well. The mentioned swirl-generation is reinforced in the invention by a differently shaped implementation of the inlet ducts 34, 35, consideration also having been paid to the location of the ridge 28 in the combustion chamber 3. The inlet ducts 34, 35 depart from an opening 31 common to both ducts and situated in the side wall 32 of the cylinder head, the ducts subsequently being divided by an intermediate wall 33 cast in the cylinder head 1 into two essentially parallel ducts 34, 35 leading to the respective port 4 and 5, as will be seen from FIGS. 1 and 4. The duct 34 has a lower wall portion 36 which is depressed relative the corresponding wall portion 37 of the duct 35. An upper wall portion in the duct 34 opposite to the wall portion 36 is formed as a ramp 38 (see FIG. 5). The ramp 38 together with the opposing wall portion 36 directs the gas flow at a relatively small angle to the base plane 2 of the cylinder head. The angle of the ramp 38 to the base plane 2 is to advantage between 14° and 20°, and its angle to the valve motion direction should be between 40° and 60°. The ramp 38 is situated upstream of a valve guide 41 projecting into the duct. There is no counterpart to the ramp 38 in the inlet duct 35, and the implementation of the upper portion of this duct is entirely conventional, which is apparent from the dashed line in FIGS. 4 and 5. The different implementation of the inlet ducts 34, 35 and the presence of the ramp 38 in the duct 34 also result in that the valve guide 41 projecting into the duct 34 has a considerably shorter distance to the port 4 than the distance prevailing between the valve guide 42 in the duct 38 and its port 5. Coolant ducts 39 included in the engine cooling system are also illustrated in FIGS. 1 and 4.

During the induction stroke, when the inlet valves 18 are kept open and the exhaust valves 19 closed, gas flows through the ducts 34, 35 and their ports 4, 5 and past the valve mushrooms 21 into the combustion chamber 3. The ramp 38 and the depressed wall portion 36 in the duct 34 then give the gas flow a direction which results in that the major portion of the gas flow is urged past the upper portion of the inlet valve mushroom 21. The chief gas flow thus obtains a direction having a comparatively small angle to the base plane 2 of the cylinder head, and the gas flow will thus sweep along the combustion chamber walls and be guided by the ridge 28 so that swirl generation is reinforced. On the other hand, the gas flowing through the inlet duct 35 is given a direction having at the port 5 a relatively large angle to the base plane 2. The direction can be regarded as substantially that of the motion of the inlet valve 18. The gas flow will thus distribute itself relatively uniformly past the valve mushroom and there is thus avoided the generation of a swirl counter-directed to the swirl achieved by the gas flow from the inlet port 4. Since the gas flow from the inlet port 5 is also guided by the ridge 28 so that a counter-directed swirl generation is prevented, there is ensured a desired swirl generation for high loading of the engine also. A desired comparatively quiet combustion is thus obtained in the inventive engine, which is achieved by the inventive introduction of asymmetry in the combustion chamber and inlet ducts connected therewith.

The embodiment example described above may not be considered to restrict the invention, which within the scope of the following claims may be modified in a plurality of embodiments.

We claim:

1. A cylinder head for an internal combustion engine having at least one cylinder with a reciprocating piston, said cylinder head having a base plane and accommodating a combustion chamber for the cylinder with valve-regulated ports, which, when projected on a circular surface in the base plane of the cylinder head facing towards the cylinder are distributed with a port in each of four quadrants, so that with the quadrants numbered clockwise, the ports at a first and a second inlet duct are situated in a first and second quadrant, respectively, and so that the ports of a first and a second exhaust duct are situated in a third and a fourth quadrant, respectively, and said combustion chamber having an interior surface facing the base plane, a portion of said interior surface between the port of the second inlet duct and the port of the first exhaust duct being formed with an inwardly curved ridge which extends from a central portion of said interior surface downwardly to its intersection with the base plane, defining a protrusion having a bottom surface parallel to said base plane, said protrusion extending radially towards the cylinder axis, and in that the remaining interior surfaces of the combustion chamber, where intersecting the base plane, lack such protrusions, characterized in that said ridge extends along the interior surface of the combustion chamber at least to a vicinity of a line extending between a center of the second inlet port and a center of the first exhaust duct port and in that the inlet ducts are asymmetrically formed in relation to each other such that the first inlet duct gives a gas flowing therethrough a direction with a substantially lesser angle to the base plane than that of a corresponding angle of the gas direction from the second inlet duct.

2. A cylinder head as in claim 1 characterized in that between the port of the second inlet duct and the port of the first exhaust duct the ridge extends along the interior surface of the combustion chamber past a line extending between the centers of said ports.

3. A cylinder head as claimed in claim 1 characterized in that the ports of the inlet ducts have equal through-flow area.

4. A cylinder head as in claim 1, characterized in that only the first inlet duct is provided with an inner wall formed as a ramp, said ramp being arranged upstream of a valve guide projecting into the duct so that the ramp guides the direction of a gas flow at a given angle to the base plane.

5. A cylinder head as in claim 4, characterized in that the ramp has an angle relative to the base plane which angle is between 14° and 20°, and that the angle of the ramp relative the longitudinal direction of the valve guide is between 40° and 60°.

6. A cylinder head as in claim 5, characterized in that the wall of the first inlet duct closest to the base plane is situated substantially closer to the base plane than is the corresponding portion of the second inlet duct.

7. A cylinder head as in claim 1, characterized in that the protrusion has a radial extension forming a crest with a radius substantially equal to a predetermined radius of the second inlet duct port.

8. A cylinder head as in claim 7, characterized in that between the port of the second inlet and the port of the first exhaust duct the ridge extends along the interior surface of the combustion chamber past a line extending between the centers of said ports.

9. A cylinder head as in claim 7, characterized in that the protrusion has a radial extension from an imagined straight side edge between the port of the second inlet duct and the port of the first exhaust duct which extension attains to between 8 and 16 percent of distance between the cylinder axis and the imagined side edge.

10. A cylinder head as in claim 9, characterized in that the remaining interior surfaces of the combustion chamber, where intersecting the base plane, have straight side edges substantially at right angles to each other, corners between the side edges being formed with radii, each of which substantially corresponds to a radius of the duct port in the respective quadrant.

* * * * *